US007711711B1

(12) United States Patent
Linnell et al.

(10) Patent No.: US 7,711,711 B1
(45) Date of Patent: May 4, 2010

(54) NETWORKED STORAGE SYSTEM EMPLOYING INFORMATION LIFECYCLE MANAGEMENT IN CONJUNCTION WITH A DISTRIBUTED GLOBAL FILE SYSTEM

(75) Inventors: J. Andrew Linnell, Hudson, MA (US); Daniel D'Orazio, Lake Zurich, IL (US)

(73) Assignee: EMC Corporation, Hopkinton, MA (US)

( * ) Notice: Subject to any disclaimer, the term of this patent is extended or adjusted under 35 U.S.C. 154(b) by 292 days.

(21) Appl. No.: 11/393,185

(22) Filed: Mar. 29, 2006

(51) Int. Cl.
*G06F 12/00* (2006.01)
(52) U.S. Cl. .................................. 707/652; 707/667
(58) Field of Classification Search ................. 707/204, 707/10; 709/219, 223; 714/7
See application file for complete search history.

(56) References Cited

U.S. PATENT DOCUMENTS

| | | | | |
|---|---|---|---|---|
| 6,615,253 | B1 * | 9/2003 | Bowman-Amuah | 709/219 |
| 6,782,389 | B1 * | 8/2004 | Chrin et al. | 707/10 |
| 2002/0199129 | A1 * | 12/2002 | Bohrer et al. | 714/7 |
| 2005/0120189 | A1 * | 6/2005 | Black | 711/165 |
| 2006/0282701 | A1 * | 12/2006 | Davies et al. | 714/6 |
| 2008/0109546 | A1 * | 5/2008 | Yamamoto et al. | 709/223 |

OTHER PUBLICATIONS

A daraflow representation for defining behaviours within virtual environments, A. Steed, M. Slater, ACM, 1996, p. 1-2.*
IEEE, no matched results, Nov. 5, 2009, p. 1.*
New insights into myosin evolution and classifications, Bernardo J. Fothau, Marc C. Goedecke, Dominique Soldati, p. 1, google.com.*
IBRIX System Block Diagram; http://www.ibrix.com/images/dell_segment_1g.gif, accessed Jan. 31, 2006.

* cited by examiner

*Primary Examiner*—Mohammad Ali
*Assistant Examiner*—Donald Lawson
(74) *Attorney, Agent, or Firm*—Bainwood Huang

(57) ABSTRACT

A networked storage system includes network-attached file system (FS) nodes implementing a distributed global file system. Each FS node includes a file system server and at least one storage system including storage resources (such as disk drives) representing portions of a global file system storage space. The FS nodes are organized according to respective cost-performance characteristics of the storage systems, generally ranging from a high-cost, high-performance characteristic to a low-cost, low-performance characteristic. A storage management system performs information lifecycle management (ILM) which includes allocating the FS nodes for storing data according to a mapping between an ILM-based data classification scheme and the cost-performance characteristics of the storage devices, as well as dynamically managing the placement of data among the storage devices according to the ILM-based classification of the data. The storage management system also performs global file system management including allocating a set of identifiers (e.g. segment identifiers) of the distributed global file system among the FS nodes, and dynamically adjusting the allocation of the identifiers among the FS nodes in response to the addition and removal of whole storage systems and/or storage resources within each of the storage systems.

12 Claims, 4 Drawing Sheets

NETWORKED STORAGE SYSTEM EMPLOYING INFORMATION LIFECYCLE MANAGEMENT IN CONJUNCTION WITH A DISTRIBUTED GLOBAL FILE SYSTEM

BACKGROUND

The invention pertains to the field of data storage.

In the field of data storage, so-called "distributed" file systems are known in which storage resources on file servers are made available to remote hosts computers via a communications network such as a TCP/IP network. Well known examples of such file systems include Distributed File System (DFS) and Network File System (NFS). Storage resources in the form of volumes or directories are made available to host computers by a "mount" operation that creates an association between a local identifier (such as the well known letter identifiers of Windows® operating systems) and a network identifier (typically a pairing of a host name and a volume or directory name). Host references to the local identifier are forwarded to a local client component of the distributed file system, which engages in a specialized protocol with the file server to perform the requested storage operation on the remote storage resource.

More recently, "global" distributed file systems have been created which are characterized by a single "namespace" for all storage resources in a network. In traditional distributed file systems, it is necessary to identify the host computer on which the storage resource resides, and thus the namespace includes both host identifiers as well as volume/directory/file identifiers. From the perspective of many applications programs that utilize network storage, the need to identify a physical host computer as part of accessing data may be undesirable. Global file systems address this drawback of traditional distributed file systems by creating a single namespace for all resources in a given network, so that it is unnecessary to explicitly identify host computers as part of accessing storage data.

Global file systems have suffered performance issues arising from centralized management of so-called "metadata", which is the data that identifies where all the user data is stored in the network and the mapping of the single namespace to identifiers of host computers and storage devices on which the user data is stored. Thus a further recent development in the field has been a "segmented" distributed file system in which the metadata itself is managed in a distributed rather than a centralized fashion. In one commercially available segmented file system, the totality of a single virtual storage space is divided into numbered segments, in a manner somewhat akin to the use of area codes in the telephone system. Also like the telephone system, storage requests are routed among servers based on locally stored subsets of the metadata. Thus if a request is directed to segment 205, for example, and first encounters a server that is responsible for segments 100-199, that server consults its local metadata to identify another server to which the request should be routed. The other server may be the server responsible for the requested segment, or it may be a server that is along a path to the responsible server.

Distributed file systems in general provide relatively good scaling as demand for storage resources in a network grows. However, the management of the namespace and access to the metadata can become difficult in larger networks. Segmented file systems provide even better scaling by their use of a single namespace and distributed metadata management. Storage resources can easily be added to a system in any of various forms, such as high-end integrated cached disk arrays (IC-DAs) to mid-range systems to low-end systems having only a few disk drives and fitting within a single shelf of an equipment rack, by relatively simple configuration operations.

There is also a movement within the field of data storage toward so-called information lifecycle management or ILM, which involves classifying data according to its use and then assigning the data to one of different types of storage devices to achieve a desired cost/performance objective. As an example, an ILM system may classify data according to how frequently it is accessed, how delay-sensitive the associated application is, the need for protection in form of redundancy, etc. The classification of data can change over its lifetime, and as its classification changes the ILM should automatically move the data to a more appropriate form of storage. Data that has been recently created and that is in high demand, for example, may be deployed on a relatively expensive high-performance storage system, whereas the same data at a later time experiencing much less frequent access may be moved to a mid-range or even low-end storage system. Archival storage can be employed to store data that has reached the end of its production lifetime. ILM systems allow system users to create various policies for how data is to be treated based on its classification.

SUMMARY

One of the drawbacks of known ILM approaches is that they have generally been limited to use in either direct-attached or SAN-attached storage systems (SAN being an acronym for storage area network, a network of relatively tightly coupled hosts and storage systems), or have been used in conjunction with traditional, non-segmented distributed file systems and all the attendant drawbacks.

In accordance with the present invention, methods and apparatus are disclosed in which a global file system such as a segmented file system is utilized in conjunction with ILM in a synergistic fashion, to realize an overall distributed data storage system that has the attributes of easy configuration and operation along with high scalability. In particular, the disclosed methods and apparatus take advantage of mechanisms in a segmented global file system to satisfy ILM-related needs such as a data classification and the automated movement of data among servers.

A disclosed networked storage system includes a number of network-attached file system (FS) nodes implementing a distributed global file system. Each FS node includes a file system server and at least one storage system coupled to the file system server, with each storage system including respective storage resources (such as disk drives) representing respective portions of a global file system storage space. The FS nodes are organized according to respective cost-performance characteristics of the storage systems, generally ranging from a high-cost, high-performance characteristic to a low-cost, low-performance characteristic.

A storage management system is coupled to the FS nodes and operates with the FS nodes to perform information lifecycle management (ILM) as well as global file system management. The ILM functionality includes allocating the FS nodes for storing data according to a mapping between an ILM-based data classification scheme and the cost-performance characteristics of the storage devices, as well as dynamically managing the placement of data among the storage devices according to the ILM-based classification of the data. The global file system management includes allocating a set of identifiers (e.g. segment identifiers) of the distributed global file system among the FS nodes according to their respective portions of the global file system storage space, and dynamically adjusting the allocation of the set of identifiers among the FS nodes in response to the addition and removal of whole storage systems and/or storage resources (e.g. disk drives) within each of the storage systems.

In accordance with the needs of the system from an ILM perspective, storage resources can easily be added where needed without causing great difficulty in managing the file system identifiers. By natural operation of a segmented file system, for example, segments can easily be assigned or reassigned to among the storage devices. Additionally, when a segmented file system employing load-balancing features is utilized, the underlying mechanisms that are used to carry out the load balancing, including mechanisms that move files from one storage system to another, can also be used in performing ILM-related moving of data, and thus the overall system benefits.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
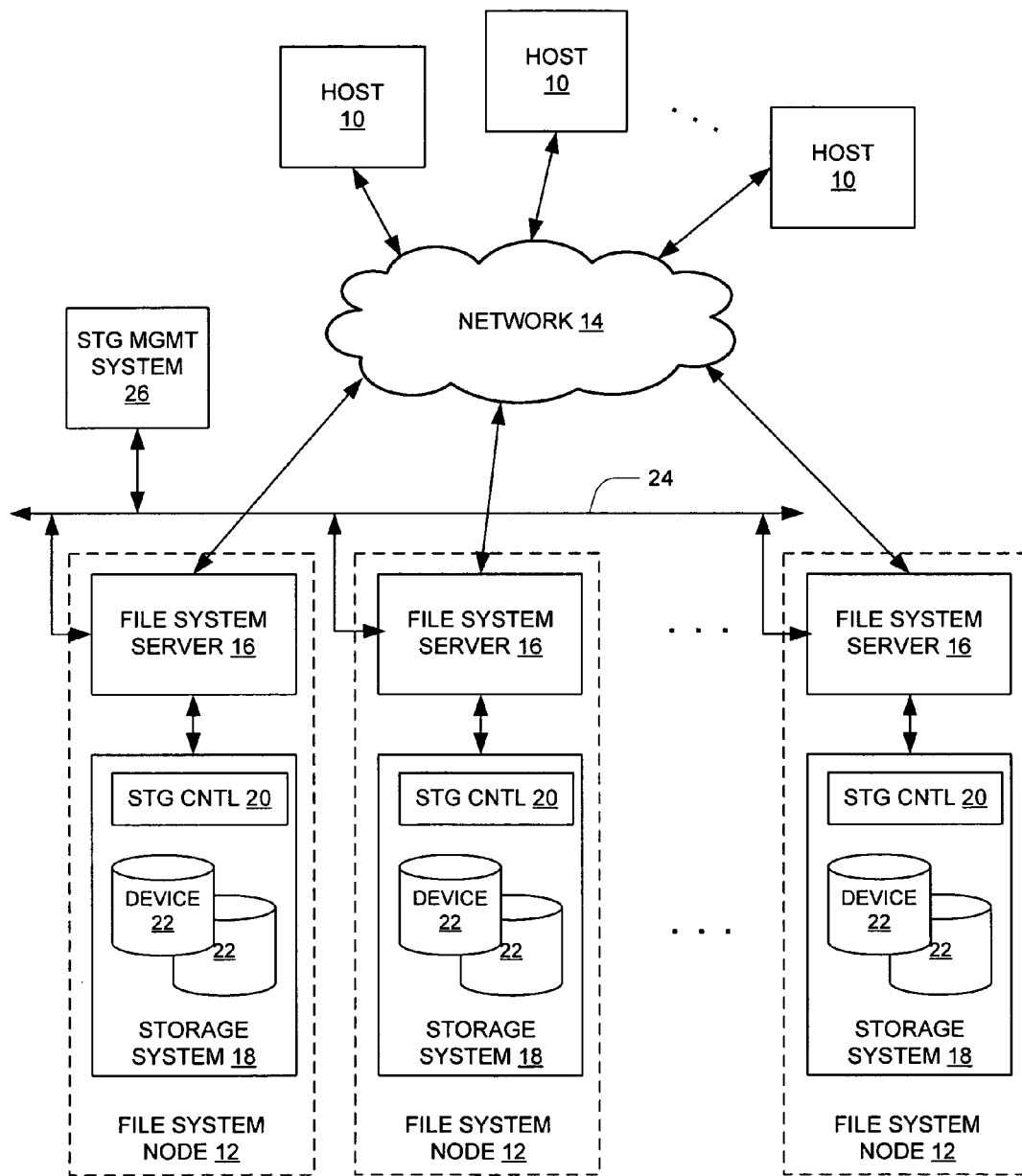
FIG. 1 is a block diagram of a data processing system including a networked storage system in accordance with the present invention.

FIG. 1 shows a data processing system having a number of host computers (hosts) 10 and a networked storage system having file system nodes (FS nodes) 12 coupled together via a network 14. Each FS node 12 includes a file system server 16 coupled to one or more storage systems 18, each including a storage controller (STG CNTL) 20 and a plurality of storage devices 22 such as disk drives. The file system servers 16 are coupled to a server management network 24 to which a storage management system 26 is also coupled.

The system of FIG. 1 is noteworthy in several respects. For one, it is an example of so-called network-attached storage or NAS, in which storage resources are available to the hosts 10 via a network 14 such as a TCP/IP network rather than tightly coupled to the hosts 10 such by direct attachment or use of a storage area network (SAN). NAS generally provides for easy scaling of the storage resources as system requirements grow. Indeed, it is apparent from FIG. 1 that the overall storage capacity of the system can be increased by adding additional FS nodes 12, and thus there is a modular aspect to the system as well. It should be noted that in FIG. 1 each storage system 18 is shown as being directly attached to the file system server 16 of the same FS node 12, but in alternative embodiments it may be desirable to employ a SAN within each FS node 12.

As described in more detail below, the networked storage system of FIG. 1 utilizes a particular form of distributed file system referred to as a "global" file system. A global file system maintains a single namespace for sub-directories and files as visible from all the hosts 10. The global file system may be mounted as a single (very large) volume, or it may be partitioned into multiple volumes as may be desired. In operation, the storage management system 26 and the file system servers 16 co-operate to dynamically distribute and maintain corresponding portions of the overall namespace as a function of available resources. As also described below, these components also co-operate to dynamically move directories and files among the FS nodes 12 for purposes of load balancing and information lifecycle management (ILM). Although in FIG. 1 the FS nodes 12 are all shown in an identical manner, in an actual system the various nodes 12 may not be identical, and in fact it is desirable from an ILM perspective that they not be. Examples of heterogeneous collections of FS nodes 12 are described below.

Figure 2:
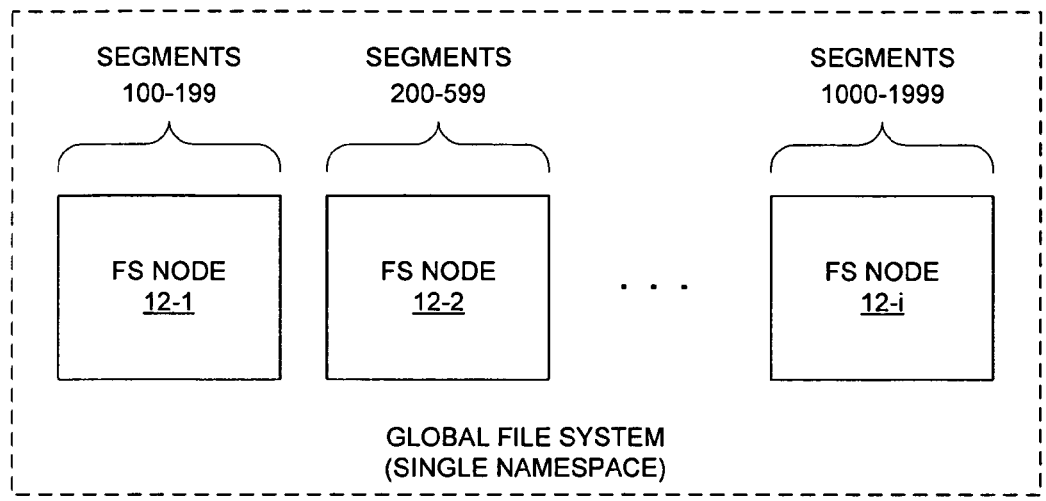
FIG. 2 is a diagram illustrating the structure of a single namespace in a global file system in the system of FIG. 1.

FIG. 2 is a schematic illustration of the global file system. In one embodiment, the global file system takes the form of a "segmented" file system having a single space subdivided into "segments" that may be identified numerically, for example. The segments are distributed among different FS nodes 12. In the illustrated example, the file system has segments labeled from 100 to 1999. As shown, segments 100-199 reside on FS node 12-1, segments 200-599 on FS node 12-2, etc., and segments 1000-1999 reside on FS node 12-i. The situation in FIG. 2 represents a single point in time. In operation of a segmented global file system, the storage management system 26 (FIG. 1) dynamically re-assigns segments among the FS nodes 12 based on the addition or removal of FS nodes 12, the available storage capacity at each FS node 12, and other factors. In one embodiment, a segmented global file system may employ a distributed approach to managing so-called "metadata", which is the information used by the system to locate segments in response to a request, for example. Centralized approaches to metadata management may also be employed.

Figure 3:
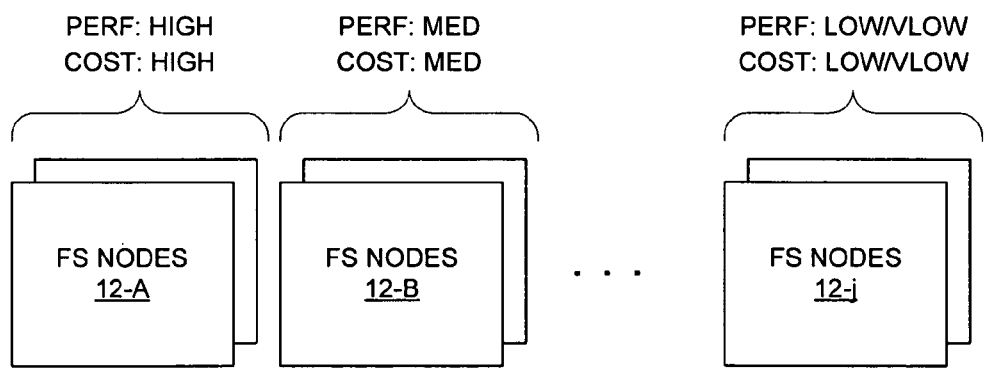
FIG. 3 is a diagram illustrating classes of cost/performance characteristics of file system nodes in the system of FIG. 1.

FIG. 3 illustrates another aspect of the networked storage system, namely a hierarchical or tiered nature of the storage resources deployed in the FS nodes 12. In FIG. 3, a first group of FS nodes 12-A provide high performance but also have a relatively high cost. "Performance" in this context may refer to data access times and/or bandwidth, but also to levels of protection, replication, or service. An example of a storage system falling in this category is an integrated cached disk array (ICDA) such as sold by EMC Corporation under the trademark SYMMETRIX®. A second group of FS nodes 12-B provide relatively medium performance at medium cost. Examples include the CLARiiON® CX, BX and AX families of storage systems sold by EMC. There may be other groups of FS nodes 12 having intermediate cost/performance characteristics. A final group of FS nodes 12-j provide storage at low or very low (VLow) cost, and may be intended primarily for archive storage rather than any kind of production use. Examples in this category include the Centera® family of archive storage products from EMC. Alternative candidates include so-called WORM devices, which provide write-once, read-many functionality.

Figures 4, 5:
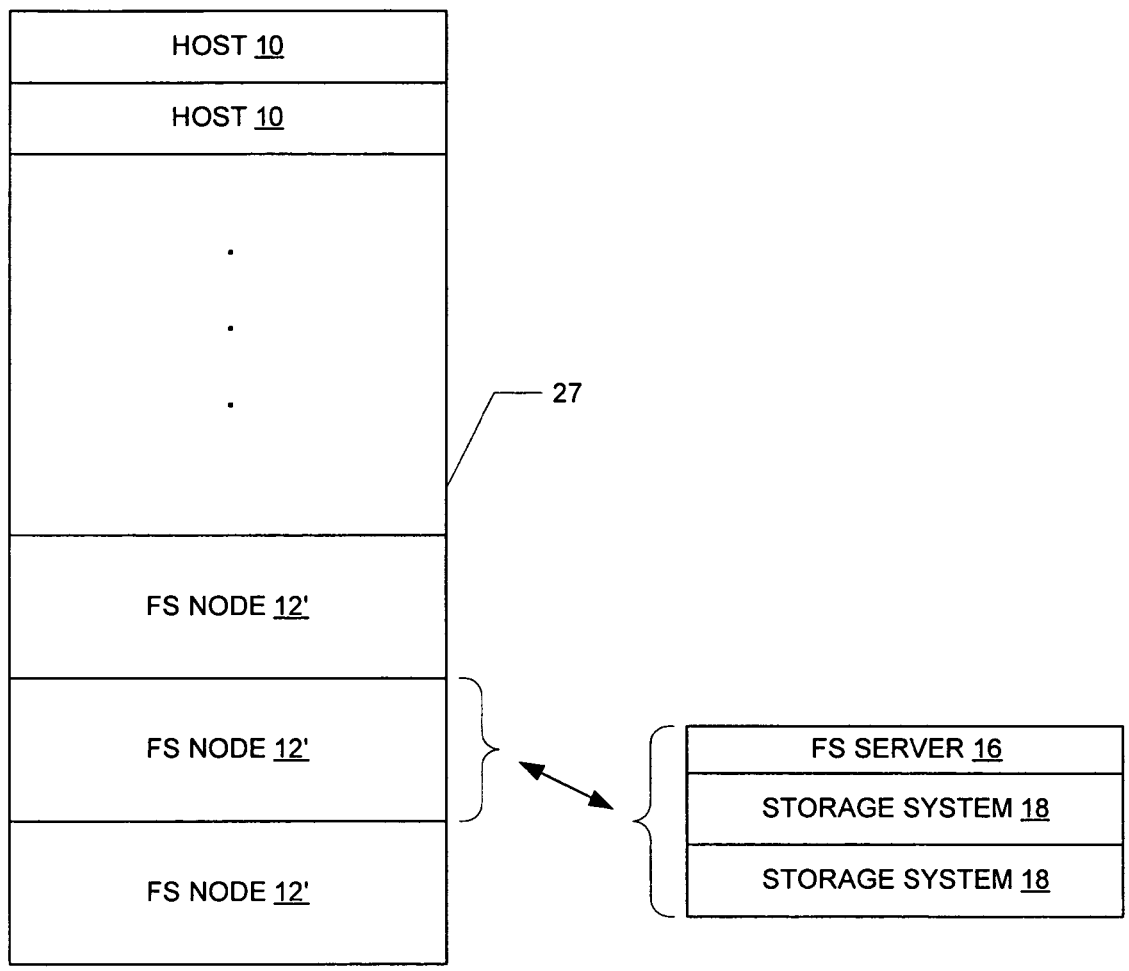
FIG. 4 is a front view of an exemplary physical packaging arrangement for components of the system of FIG. 1.
FIG. 5 is a front view of an exemplary physical packaging arrangement for a file system node in the arrangement of FIG. 4.

FIG. 4 illustrates a physical packaging arrangement that can be used for the system of FIG. 1. A standard 19" wide equipment rack 27 includes FS nodes 12' and hosts 10. As shown, the FS nodes 12' may be mounted at the bottom of the rack 27 and the hosts 10 at the top. In this fashion, the addition of more hosts 10 and/or FS nodes 12' can be easily accommodated. As shown in FIG. 5, each FS node 12' includes one file system server 16 and two storage systems 18. In the illustrated embodiment, the file system server 16 is packaged as a so-called "blade" that requires only 1 U of rack height, and each storage system 18 is housed in an enclosure occupying 2 U of rack height. It is possible to package a controller 20 and a number of disk drive devices 22 in such a space.

Figure 6:
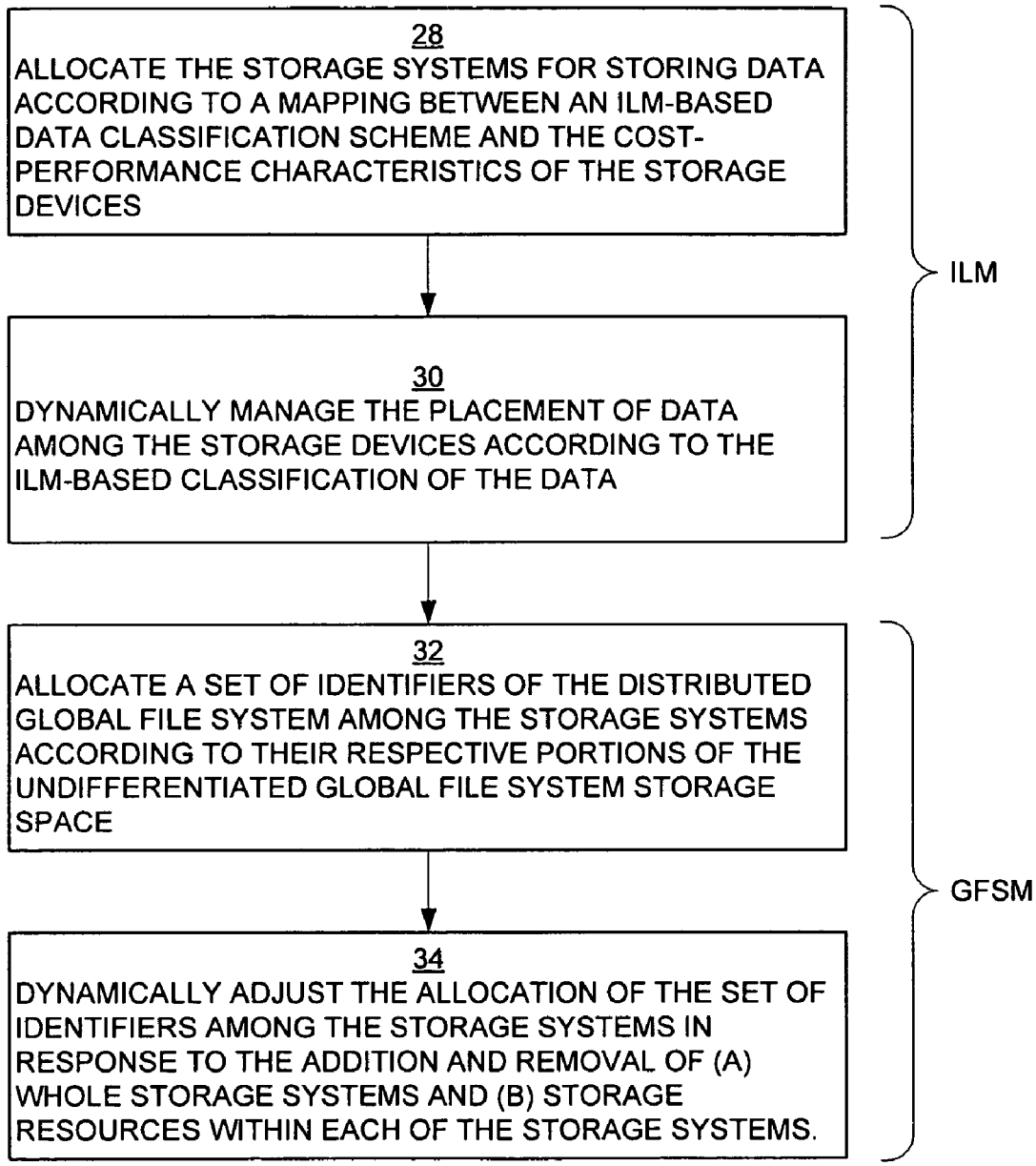
FIG. 6 is a flow diagram depicting overall operation of a storage management system and file system nodes in the system of FIG. 1.

FIG. 6 shows the overall manner of operation of the system of FIG. 1, in particular the operation of the storage management system 26 in conjunction with the FS nodes 12. Steps 28 and 30 are carried out as part of information lifecycle management (ILM), and steps 32-34 are part of the management/operation of the global file system (GFSM). In step 28, the storage management system 26 allocates the storage systems 18 for storing data according to a mapping between an ILM-based data classification scheme and the cost-performance characteristics of the storage systems. These are described in more detail below. In step 30, the storage management system 26 dynamically manages the placement of data among the storage systems 18 according to the ILM-based classification of the data.

In step 32 as part of file-system management, the storage management system allocates a set of identifiers of the distributed global file system among the FS nodes 12 according to their respective portions of the overall global file system storage space. During operation, the storage management system 26 dynamically adjusts the allocation of the set of identifiers among the FS nodes 12 in response to the addition and removal of (a) whole storage systems 18 and (b) storage resources (such as individual disk drives) within each of the storage systems 18. However, these need not be the only considerations. For example, consideration may be given to load balancing among the storage systems 18 to avoid or minimize delay-causing bottlenecks. If a given set of segments allocated to a particular storage system 18 are experiencing heavy access demand while other segments on other storage systems 18 are experiencing relatively light demand, then it may be beneficial to move one or more of the segments from the one storage system 18 to the other. It is noted that the mechanisms employed by the storage management system 26 and the FS nodes 12 in moving segments for load-balancing purposes can also be utilized to move segments for ILM-related purposes as determined by the storage management system 26.

An example is given to illustrate the operations of FIG. 6. In Table 1 below are listed three sets of items that require mapping according to the process of FIG. 6: Segment identifiers (IDs) that identify respective portions of the overall global file system space as explained above with reference to FIG. 2; ILM Classifications (ILM Class) of storage systems 18; and cost-performance (C-P) characteristics of storage systems 18 as explained above with reference to FIG. 3.

TABLE 1

| Segment ID | ILM Class | C-P Characteristic/System ID |
|---|---|---|
| A | Active - high | (High-High)/A1, A2, ... Ax |
| B | Active - med | (Med-Med)/B1, B2, ... By |
| C | Active - low | (Low-Low)/C1, C2, ... Cz |
| ... | Inactive - recent | (Vlow-Vlow)/D1, D2, ... Dz |
| Z | Inactive - older | |
| | Inactive - archive | |

With respect to the ILM classification, these are generally based on differentiated patterns of data usage in a networked storage system. The ILM classifications in Table 1 are simplified and somewhat contrived, but illustrate the general principles. It will be appreciated that ILM-related classification in any real system may be more complex. In the above example, two major classifications are "Active" and "Inactive", which may be differentiated for example by some threshold of access frequency over a relevant period. For example, if a file has been accessed fewer than A times in the past M months, then it is deemed "Inactive", and is otherwise "Active". Within each of these major classes are sub-classes as may be desired. In the example scheme of Table 1, the Active class has three sub-classes "high", "med", and "low" for corresponding access frequencies. The Inactive class has three sub-classes labeled "recent", "older" and "archive", which reflect the amount of time that has passed since the data has become Inactive.

It is the responsibility of the storage management system 26, in conjunction with a human system manager as appropriate, to establish and dynamically manage the mappings or relationships among the segment IDs, ILM Classes, cost-performance characteristics to achieve optimal use of the available storage resources from performance and cost perspectives and to further the goal of easy scalability. It is difficult or impossible to define good mappings abstractly, because the relative "goodness" depends on the exact characteristics of the processing workload, ILM policies, mix of storage resources, and other aspects of any real system. Generally, the mapping of ILM classifications to cost-performance characteristics of the storage systems may be somewhat linear—i.e., those data classified as (Active, High) may map to (High cost, High performance) storage systems, and successively lower ILM classes may map to corresponding successively lower cost-performance classes.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A networked storage system, comprising:

a plurality of network-attached file system (FS) nodes each including a file system server and at least one storage system coupled to the file system server, each storage system including a storage controller having a respective processor and one or more data storage devices, the FS nodes being arranged into cost-performance groups ranging from a first cost-performance group of FS nodes providing high performance at high cost to a second cost-performance group of FS nodes providing low performance at low cost; and a storage management system coupled to the FS nodes, the storage management system having a processor and being operative in conjunction with the FS nodes to:

define a distributed global file system across the FS nodes, the distributed global file system being divided into segments for storing data files and having a single namespace of segment identifiers for the segments as visible from host computers utilizing the networked storage system, the segment identifiers lacking any identification of the FS nodes;

monitor frequency of access of the data files and based on the monitoring assign the data files to respective information lifecycle management (ILM) classes, the ILM classes ranging from an active class for data files having a high and recent access frequency to an inactive class for data files having a low and less recent access frequency; and assigning the FS nodes to store respective segments of the distributed global file system according to a mapping between the cost-performance characteristics of the FS nodes and the ILM classes of the data files contained in the segments, such that segments containing data files assigned to the active class are stored in the FS nodes of the first cost-performance group and segments containing data files assigned to the inactive class are stored in the FS nodes of the second cost-performance group, wherein the active and inactive ILM classes are major ILM classes and each includes a plurality of sub-classes, the sub-classes of the active class including active-high and active-low sub-classes distinguished by relatively higher and lower access frequencies, and the sub-classes of the inactive class including inactive-recent and inactive-older sub-classes distinguished by an amount of time that data files have been assigned to the respective sub-classes.

2. A networked storage system according to claim 1, wherein the storage management system and FS nodes are further operative to dynamically adjust the allocation of the segment identifiers among the FS nodes to achieve balanced loading of the FS nodes.

3. A networked storage system according to claim 2, wherein the storage management system and FS nodes employ a common set of mechanisms for dynamically adjusting the allocation of the segment identifiers among the FS nodes for both load-balancing purposes and ILM-related placement of data.

4. A networked storage system according to claim 1, wherein the storage devices include at least one integrated cached disk array (ICDA) having the high-cost, high-performance characteristic and at least one archival storage system having the low-cost, low-performance characteristic.

5. A networked storage system according to claim 1, wherein each FS node is physically packaged as (1) a rack-mountable or blade type of server and (2) one or more rack-mountable enclosures each containing a corresponding storage system of the FS node.

6. A networked storage system according to claim 1, wherein the inactive classification includes an archival classification for end-of-lifetime data, and the corresponding relatively low cost-performance storage devices include archival storage devices having high storage density, slow access times, and low cost per unit of storage.

7. A networked storage system according to claim 1, wherein the segment identifiers are consecutively ordered alphabetic or numeric values.

8. A method of operating a networked storage system including a plurality of network-attached file system (FS) nodes, each FS node including a file system server and at least one storage system coupled to the file system server, each storage system including a storage controller having a processor and one or more data storage devices, the method comprising:

arranging the FS nodes into cost-performance groups ranging from a first cost-performance group of FS nodes providing high performance at high cost to a second cost-performance group of FS nodes providing low performance at low cost; and in a storage management system in conjunction with the FS nodes, the storage management system having a processor:

defining a distributed global file system across the FS nodes, the distributed global file system being divided into segments for storing data files and having a single namespace of segment identifiers for the segments as visible from host computers utilizing the networked storage system, the segment identifiers lacking any identification of the FS nodes;

monitoring frequency of access of the data files and based on the monitoring assigning the data files to respective information lifecycle management (ILM) classes, the ILM classes ranging from an active-high class for data files having a high and recent frequency of access to an inactive-low class for data files having a low and less recent frequency of access; and assigning the FS nodes to store respective segments of the distributed global file system according to a mapping between the cost-performance characteristics of the FS nodes and the ILM classes of the data files contained in the segments, such that segments containing data files assigned to the active-high class are stored in the FS nodes of the first cost-performance group and segments containing data files assigned to the inactive-low class are stored in the FS nodes of the second cost-performance group, wherein the active and inactive ILM classes are major ILM classes and each includes a plurality of sub-classes, the sub-classes of the active class including active-high and active-low sub-classes distinguished by relatively higher and lower access frequencies, and the sub-classes of the inactive class including inactive-recent and inactive-older sub-classes distinguished by an amount of time that data files have been assigned to the respective sub-classes.

9. A method according to claim 8, further comprising dynamically adjusting the allocation of the segment identifiers among the FS nodes to achieve balanced loading of the FS nodes.

10. A method according to claim 9, further comprising employing a common set of mechanisms in the storage management system and FS nodes for dynamically adjusting the allocation of the segment identifiers among the FS nodes for both load-balancing purposes and ILM-related placement of data.

11. A method according to claim 8, wherein the inactive classification includes an archival classification for end-of-lifetime data, and the corresponding relatively low cost-performance storage devices include archival storage devices having high storage density, slow access times, and low cost per unit of storage.

12. A method according to claim 8, wherein the segment identifiers are consecutively ordered alphabetic or numeric values.

* * * * *